(12) United States Patent
Wang (10) Patent No.: US 7,570,666 B2
(45) Date of Patent: Aug. 4, 2009

(54) METHOD AND APPARATUS FOR GUARD INTERVAL DETECTION IN MULTI-CARRIER RECEIVER

(75) Inventor: Hung-Hsiang Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 711 days.

(21) Appl. No.: 11/046,766

(22) Filed: Feb. 1, 2005

(65) Prior Publication Data

US 2006/0171367 A1    Aug. 3, 2006

(51) Int. Cl.
*H04J 3/06* (2006.01)
(52) U.S. Cl. ...................... 370/503; 370/504
(58) Field of Classification Search ............. 370/503, 370/504
See application file for complete search history.

(56) References Cited

U.S. PATENT DOCUMENTS

| | | | |
|---|---|---|---|
| 6,125,124 A * | 9/2000 | Junell et al. ............ 370/503 |
| 2002/0186791 A1 | 12/2002 | Foxcroft et al. | |
| 2003/0219084 A1 | 11/2003 | Parker | |
| 2004/0066802 A1 * | 4/2004 | Ro et al. ............ 370/528 |
| 2005/0286485 A1 * | 12/2005 | Golden et al. ........... 370/503 X |

OTHER PUBLICATIONS

Hiroshi Nogami, et al. A Transmission Mode Detector for OFDM Systems, Electroncis and Communications in Japan, Part 1, vol. 86, No. 8, pp. 79-94, (2003).
Shiou-Hong Chen, et al. Mode Detection, Synchronization, and Channel Estimation for DVB-T OFDM Receiver, Globecom, 0-7803-7974-8/3 (2003), pp. 2416-2420.

* cited by examiner

*Primary Examiner*—Philip J Sobutka
(74) *Attorney, Agent, or Firm*—Alston & Bird LLP (57) ABSTRACT

An apparatus and method for guard interval detection in a multi-carrier receiver has been disclosed. According to the present invention, the apparatus and method are employed for determining a guard interval length of an input signal to be one of a plurality of available guard interval lengths. The apparatus of the present invention includes an auto-correlator, a power density calculator and a maximum detector. The auto-correlator is used to generate a correlation result in response to the input signal, and the power density calculator is used to generate a plurality of power density results in response the correlation result and the available guard interval lengths. The maximum detector is employed to generate a determination result in response to the maximum value of the plurality of power density results.

16 Claims, 8 Drawing Sheets

METHOD AND APPARATUS FOR GUARD INTERVAL DETECTION IN MULTI-CARRIER RECEIVER

BACKGROUND

I. Field of the Invention

The present invention generally relates to communication systems, and, more particularly, to a method and apparatus for guard interval detection in a multi-carrier receiver.

II. Background of the Invention

In digital communication or digital broadcasting systems, information signals are transmitted in the form of electromagnetic waves from a transmitter, through a transmission channel, to a receiver. The transmitted information signals usually suffer from distortion on account of unideal channel effects such as multipath propagation or multipath fading. Recently, Orthogonal Frequency Division Multiplexing (OFDM) techniques have received a great deal of interest due to their effective transmission capability when dealing with various types of channel impairment, such as multipath fading and impulsive noise. Thus, OFDM has become the mainstream technology in the field of wireline communications, wireless communications and digital terrestrial television broadcasting. For instance, OFDM has been widely applied to ADSL (Asymmetrical Digital Subscriber Line), VDSL (Very-high-speed Digital Subscriber Line), HomePlug, DAB (Digital Audio Broadcasting), IEEE 802.11 a/g/n, 802.16a, HiperLAN/2, HiperMAN, DSRC (Dedicated Short Range Communications), UWB (Ultra Wideband), ISDB-T (Integrated Services Digital Broadcasting—Terrestrial), DVB-T (Digital Video Broadcasting—Terrestrial), DVB-H (Digital Video Broadcasting—Handheld) and so on.

Figure 1:
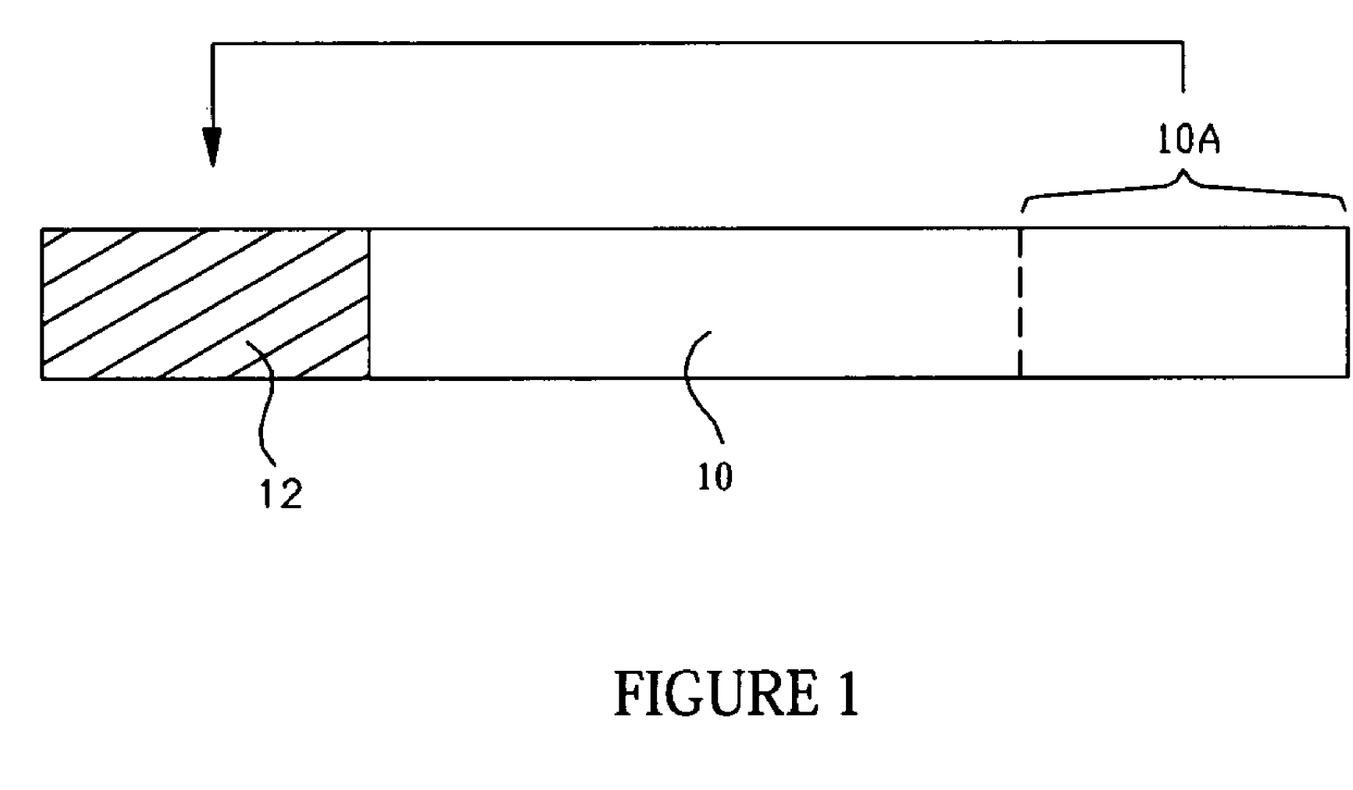
FIG. 1 is a data structure diagram of an active symbol in combination with the associated guard interval.

In a DVB-T/DVB-H system, OFDM signals further include a cyclic prefix guard interval to each active symbol in order to reduce inter-symbol interference (ISI) resulting from multipath effects. Referring to FIG. 1, a data structure diagram of an active symbol 10 in combination with the associated guard interval 12 is illustrated schematically. Specifically, the guard interval 12 is the end portion 10A of the active symbol that is repeated before the current active symbol 10. The DVB-T standard defines two available modes of operation, each of which has a specific symbol size, which in turn defines the size of the Fast Fourier Transform (FFT) in a DVB-T receiver, namely 2K mode and 8K mode. In each of these carrier modes, there are four available guard interval lengths, namely $\frac{1}{4}$, $\frac{1}{8}$, $\frac{1}{16}$ and $\frac{1}{32}$, of the respective FFT symbol duration, that is the period of the active symbol 10 as depicted in FIG. 1. The guard interval length can be selected based upon the anticipated multipath delay spread and transmission environment.

Figure 2:
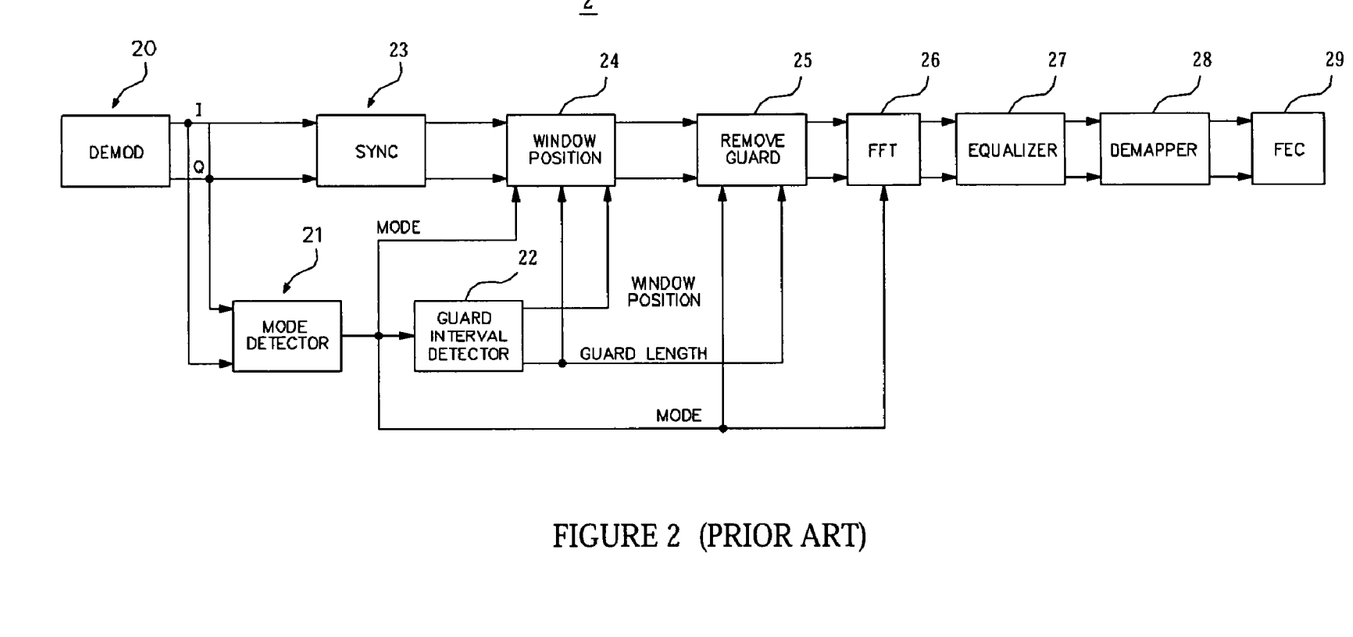
FIG. 2 is a block diagram of a conventional DVB-T receiver.

FIG. 2 is a block diagram of a conventional DVB-T receiver 2 with OFDM. As shown in FIG. 2, the received signals are input to a demodulator 20, which mixes the received RF input signal down to baseband in-phase (I) and quadrature (Q) components and produces digital samples. The baseband I and Q components are input to a mode detector 21 and thereafter to a guard interval detector 22. The mode detector 21 is employed to determine whether the received signals are transmitted in either 2K mode or 8K mode, and then provide mode detection outputs to a window position block 24, a remove guard block 25 and an FFT block 26. The guard interval detector 22 is employed to determine the guard interval length, and provide corresponding guard length outputs to the remove guard block 25 and window position outputs to the window position block 24 respectively. In FIG. 2, the baseband I and Q components are also input to a synchronizer 23, which removes at least one of frequency and sampling rate offsets and inputs signals to the window position block 24. Following determination of the window position, the processed received signals are input to the guard removal block 24, the FFT block 26, an equalizer 27, a demapper 28, and an FEC block 29. The resulting data, such as MPEG encoded signals, are output to a demultiplexing device for ultimate display.

Note that the receiver 2 of FIG. 2 is provided with the remove guard block 25 so as to remove these repetitive guard intervals and thus extract the active symbols for the FFT block 26 to allow the latter blocks to operate accurately. The remove guard block 25 performs such function according to the guard length outputs generated by the guard interval detector 22. If the guard interval length cannot be detected and removed accurately, the active symbols are so extracted inaccurately that the demodulation performance can be seriously degraded. Therefore, the guard interval detector 22 must include a mechanism for determining the length of the guard interval accurately. The chosen mechanism must be robust enough to deal with noisy signals, and with signals that suffer from multipath and co-channel interference.

The conventional guard interval detection mechanism uses a threshold value to detect the shape of the peak in a correlation function. However, an ideal threshold value is difficult to select. If the threshold value it too high, some of the points of potential interest will be missed, while, if the threshold value is too low, too many points will be examined, possibly leading to an inaccurate estimate of the guard interval length. Though it may be possible to set an initial threshold value in the guard interval detector, a further algorithm should be provided for adjusting the threshold value dynamically until a stable guard interval length can be obtained. Such algorithms, however, make the hardware architecture more complicated.

Therefore, a need exists for a method and apparatus for a multi-carrier receiver with guard interval length detection that can be easily implemented and overcomes the disadvantages of the conventional ones. The present disclosure provides such a multi-carrier receiver method and apparatus.

It is therefore an object of the present invention to provide a guard interval detector in a multi-carrier receiver that is robust enough to deal with noisy signals, and with signals that suffer from multipath and co-channel interference.

It is another object of the present invention to provide a guard interval detector in a multi-carrier receiver that can be employed to detect guard interval lengths of the received information signals accurately.

It is further object of the present invention to provide guard interval detector in a multi-carrier receiver that can be easily implemented without complicated circuit design.

BRIEF SUMMARY OF THE INVENTION

The present invention is directed to an apparatus and a method that obviate one or more problems resulting from the limitations and disadvantages of the prior art.

In accordance with an embodiment of the present invention, there is provided a guard interval detector for determining a guard interval length of an input signal to be one of a plurality of available guard interval lengths. The guard interval detector includes an auto-correlator, a power density calculator and a maximum detector. The auto-correlator is used to generate a correlation result in response to the input signal, and the power density calculator is used to generate a plurality of power density results in response the correlation result and the available guard interval lengths. The maximum detector is employed to generate a determination result in response to the maximum value of the plurality of power density results.

Also in accordance with the present invention, there is provided a method for determining a guard interval length of an input signal to be one of a plurality of available guard interval lengths. The method comprises the following steps of: (a) generating a correlation result in response to the input signal; (b) generating a plurality of power density results in response to the correlation result and the available guard interval lengths; and (c) generating a determination result in response to the maximum value of the plurality of power density results.

Further in accordance with the present invention, there is provided a guard interval detector for determining a guard interval length of an input signal to be one of a plurality of available guard interval lengths. The guard interval detector comprises an auto-correlator, a noise suppressor, a power density calculator and a maximum detector. The auto-correlator is used to generate an correlation result in response to the input signal, and the noise suppressor is used to generate a power function in response to the correlation result. The power density calculator is used to generate a plurality of power density results in response the power function and the available guard interval lengths. The maximum detector is used to generate a determination result in response to the maximum value of the plurality of power density results.

Still in accordance with the present invention, there is provided a method for determining a guard interval length of an input signal to be one of a plurality of available guard interval lengths. The method comprises the following steps of: (a) generating a correlation result in response to the input signal; (b) generating a power function in response to the correlation result; (c) generating a plurality of power density results in response to the power function and the available guard interval lengths; and (d) generating a determination result in response to the maximum value of the plurality of power density results.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serves to explain the principles of the invention.

BRIEF DESCRIPTION OF THE DRAWINGS

Reference will now be made in detail to the present embodiment of the invention, an example of which is illustrated in the accompanying drawings. Wherever possible, the same reference numbers are used throughout the drawings to refer to the same or like parts.

DETAILED DESCRIPTION OF THE INVENTION

Throughout this description, the preferred embodiment and examples shown should be considered as exemplars, rather than as limitations to the present invention.

Figure 3:
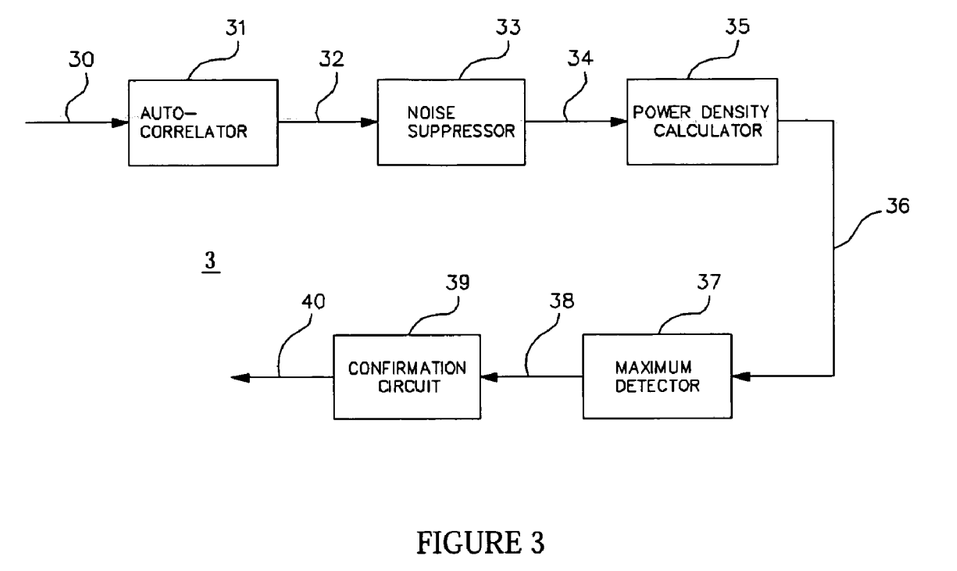
FIG. 3 is a block diagram of one preferred embodiment in accordance with a guard interval detector of the present invention.

Referring to FIG. 3, a block diagram of an exemplary embodiment of a guard interval detector in accordance with the present invention is schematically illustrated. Preferably, the exemplary embodiment can be applied to multi-carrier receivers as depicted in FIG. 2, for example receiving signals using the DVB-T or DVB-H standard with Coded Orthogonal Frequency Division Multiplexing (COFDM). As shown in FIG. 3, the guard interval detector 3 in accordance with the present invention includes an auto-correlator 31, a noise suppressor 33, a power density calculator 35, a maximum detector 37 and a confirmation circuit 39.

In FIG. 3, the received signals 30 are supplied to an input terminal of the auto-correlator 31 which is employed to calculate the moving average correlation results 32 of the received samples 30 over a minimum guard interval length, namely a window size. If the available guard interval lengths are $1/4$, $1/8$, $1/16$ and $1/32$ of one FFT symbol length L, L/32 is the minimum guard interval length. The correlation results 32 are thereafter applied to the noise suppressor 33 to calculate the corresponding power function 34 of the correlation results 32. The noise suppressor 33 is employed for the purpose of noise suppression and thus can be omitted optionally. Then, the power function 34 is supplied to the power density calculator 35 to calculate four power density results 36 over four available guard interval lengths, namely L/32, L/16, L/8 and L/4 respectively. Next, the power density results 36 are applied to the maximum detector 37 to determine the maximum value of four power density results 36 and to generate a determination result 38 accordingly. The confirmation circuit 38 is utilized to determine whether the determination result 38 can be reproductive twice, thrice or more and issue a confirmation result 40 for further processing. Preferably, the confirmation circuit 39 can be implemented by means of combination logic circuitry.

Figure 4:
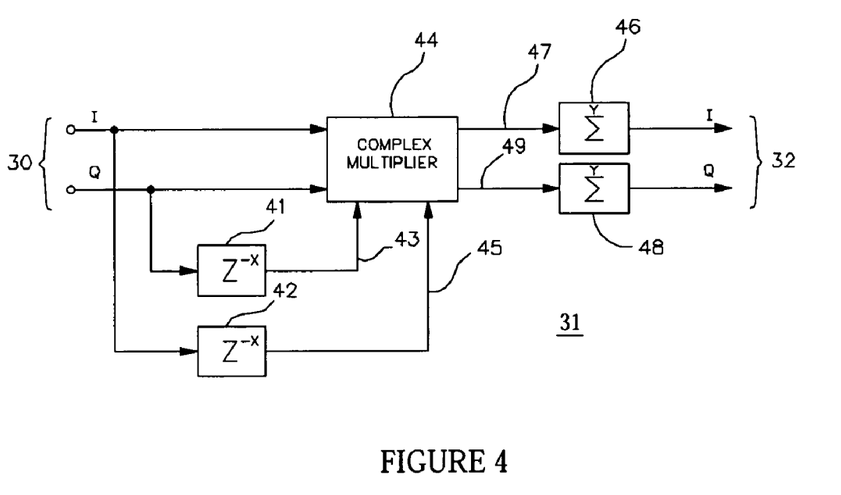
FIG. 4 illustrates a schematic diagram of one exemplary embodiment of the auto-correlator as depicted in FIG. 3.

Referring to FIG. 4, schematic diagram of one exemplary embodiment of the auto-correlator 31 as depicted in FIG. 3 is illustrated. The signals received by an antenna of the receiver are subject to a demodulator, which mixes the received RF input signal down to baseband in-phase (I) and quadrature (Q) components and produces digital samples 30. The baseband I and Q components 30 are supplied to the guard interval detector 3 which determines the length of the guard interval of the digital samples 30. In FIG. 4, the digital samples 30 are supplied to the auto-correlator 31 which includes two delay blocks 41 and 42, a complex multiplier 44 and two summation blocks 46 and 48.

As shown in FIG. 4, the digital samples 30 at respective I and Q inputs are received by the delay blocks 41 and 42 respectively. For each sample, the complex conjugate of the sample is formed, and the sample is applied to the delay block 41 or 42. The delay blocks 41 and 42 can be FIFO buffers of "X" taps, and thus applies a delay equivalent to the duration of "X" samples, where X is the FFT size, that is, for example, 2048 in 2K mode or 8192 in 8K mode, and is the duration of the active symbol, expressed in samples. Then, complex multiplication is calculated in a complex multiplier 44 by multiplying each input symbol with the appropriate symbol with the delay "X" applied thereto. Specifically, the I symbol is multiplied with the associated symbol 45 with the delay "X" while the Q symbol is multiplied with the associated symbol 43. The results 47 and 49 are then supplied to the summation blocks 46, 48 and in which respective running average is calculated over a number of samples "Y", which equals the smallest allowed guard interval size, that is, L/32. Thus, "Y"=64 samples in 2K mode and 256 samples in 8K mode. The output correlation results 32 are then generated accordingly.

Figure 5:
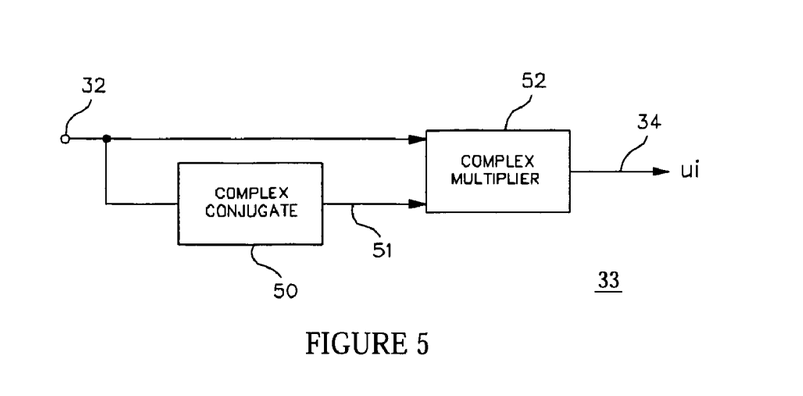
FIG. 5 illustrates a schematic diagram of one exemplary embodiment of the noise suppressor as depicted in FIG. 3.

Referring to FIG. 5, a schematic diagram of one exemplary embodiment of the noise suppressor 33 as depicted in FIG. 3 is illustrated. The noise suppressor 33 of FIG. 5 includes a complex conjugate block 50 and a complex multiplier 52. The correlation result 32 is supplied to the complex conjugate block 50 to form the complex conjugate of the correlation result 32. Then, complex multiplication is calculated in the complex multiplier 52 by multiplying the correlation result 32 with the corresponding complex conjugate 51. The output of the complex multiplier 52 is designated as the power function 34 or a symbol ui. As mentioned above, the noise suppressor 33 is employed for the purpose of noise suppression and thus can be omitted optionally.

Figure 6:
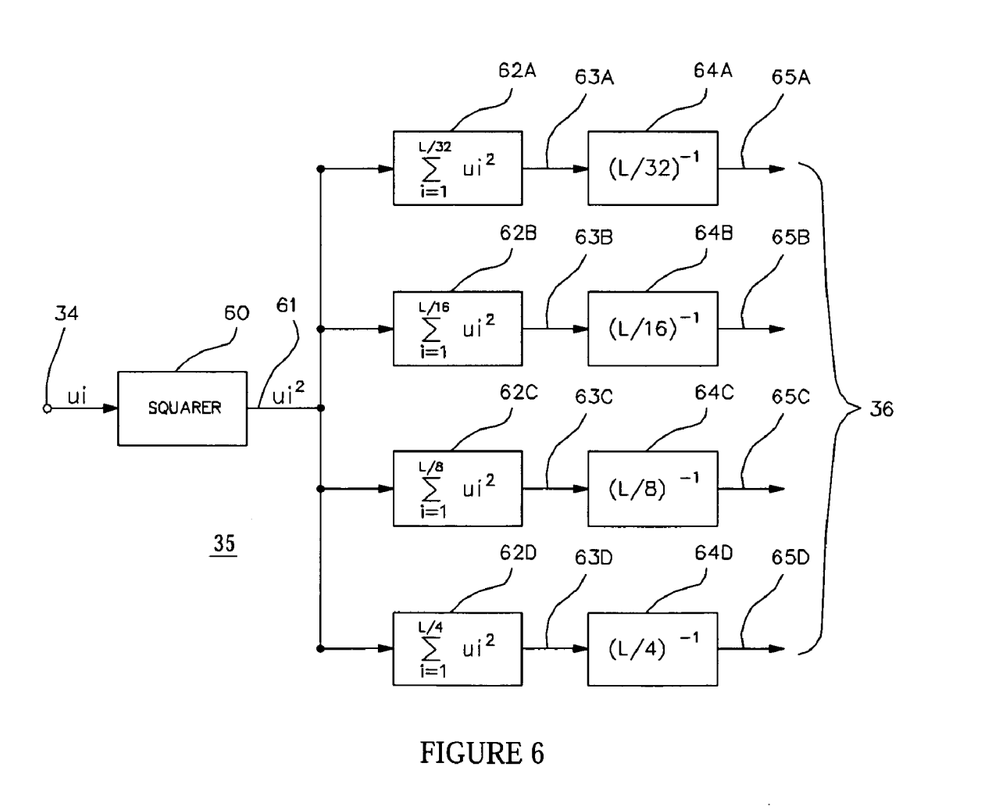
FIG. 6 illustrates a schematic diagram of one exemplary embodiment of the power density calculator as depicted in FIG. 3.

Referring to FIG. 6, a schematic diagram of one exemplary embodiment of the power density calculator 35 as depicted in FIG. 3 is thus illustrated. According to the present invention, the power density calculator 35 is utilized to calculate four power density results 36 over the duration of L/32, L/16, L/8 and L/4. In this embodiment, the power density results 36 include $$\sum_{i=1}^{L/32} ui^2/(L/32), \sum_{i=1}^{L/16} ui^2/(L/16), \sum_{i=1}^{L/8} ui^2/(L/8) \text{ and } \sum_{i=1}^{L/4} ui^2/(L/4).$$

As shown in FIG. 6, the power density calculator 35 includes a squarer 60, four accumulators 62A-62D and four dividers 64A-64D. The power function ui is subject to square operation in the squarer 60 to form $ui^2$ supplied to the accumulators 62A, 62B, 62C and 62D. The accumulators 62A, 62B, 62C and 62D are used to calculate the accumulation values $$\sum_{i=1}^{L/32} ui^2, \sum_{i=1}^{L/16} ui^2, \sum_{i=1}^{L/8} ui^2 \text{ and } \sum_{i=1}^{L/4} ui^2$$

over four different accumulation windows L/32, L/16, L/8 and L/4, respectively. In other words, the output 63A of the accumulator 62A is provided with $$\sum_{i=1}^{L/32} ui^2$$

to the divider 64A, the output 63B of the accumulator 62B is provided with $$\sum_{i=1}^{L/16} ui^2$$

to the divider 64B, the output 63C of the accumulator 62C is provided with $$\sum_{i=1}^{L/8} ui^2$$

to the divider 64C, and the output 63D of the accumulator 62D is provided with $$\sum_{i=1}^{L/4} ui^2$$

to the divider 64D. At the dividers 64A-64D, the accumulation values $$\sum_{i=1}^{L/32} ui^2, \sum_{i=1}^{L/16} ui^2, \sum_{i=1}^{L/8} ui^2 \text{ and } \sum_{i=1}^{L/4} ui^2$$

are divided by L/32, L/16, L/8 and L/4, respectively. Thus, the power density results 36, that is, $$\sum_{i=1}^{L/32} ui^2/(L/32), \sum_{i=1}^{L/16} ui^2/(L/16), \sum_{i=1}^{L/8} ui^2/(L/8) \text{ and } \sum_{i=1}^{L/4} ui^2/(L/4)$$

are generated at the output 65A-65D of the dividers 64A-64D, respectively.

Figure 7:
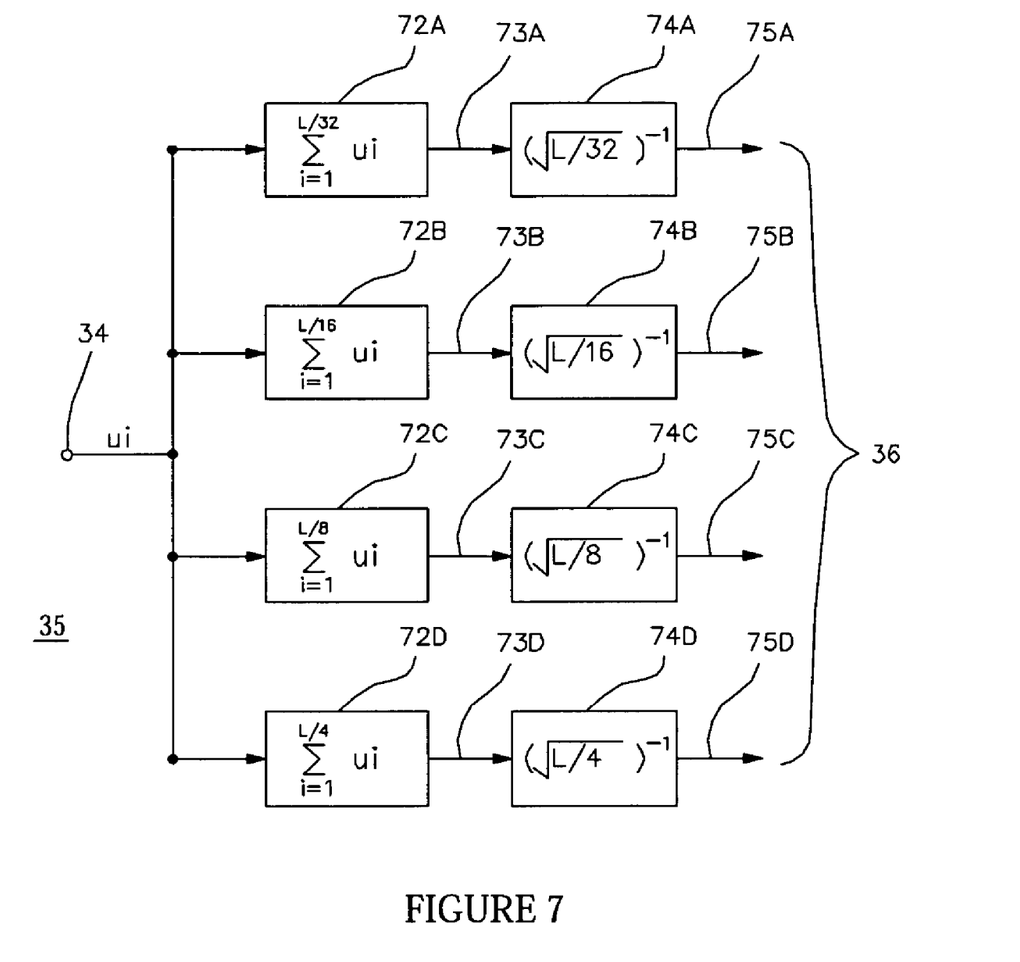
FIG. 7 illustrates a schematic diagram of another exemplary embodiment of the power density calculator as depicted in FIG. 3.

Referring to FIG. 7, a schematic diagram of another exemplary embodiment of the power density calculator 35 as depicted in FIG. 3 is therefore illustrated. In this exemplary embodiment, the power density calculator 35 is simplified to generate $$\sum_{i=1}^{L/32} ui/\sqrt{L/32}, \sum_{i=1}^{L/16} ui/\sqrt{L/16}, \sum_{i=1}^{L/8} ui/\sqrt{L/8} \text{ and } \sum_{i=1}^{L/4} ui/\sqrt{L/4}.$$

As shown in FIG. 7, the power density calculator 35 includes four accumulators 72A-72D and four dividers 74A-74D. As compared with FIG. 6, the power density calculator 35 of FIG. 7 can be implemented without a squarer and thus without complicated circuit design. The power function ui is first supplied to the accumulators 72A, 72B, 72C and 72D so as to calculate the accumulation values $$\sum_{i=1}^{L/32} ui, \sum_{i=1}^{L/16} ui, \sum_{i=1}^{L/8} ui \text{ and } \sum_{i=1}^{L/4} ui$$

over four different accumulation windows L/32, L/16, L/8 and L/4, respectively. In other words, the output 73A of the accumulator 72A is provided with $$\sum_{i=1}^{L/32} ui$$

to the divider 74A, the output 73B of the accumulator 72B is provided with $$\sum_{i=1}^{L/16} ui$$

to the divider 74B, the output 73C of the accumulator 72C is provided with $$\sum_{i=1}^{L/8} ui$$

to the divider 74C, and the output 73D of the accumulator 72D is provided with $$\sum_{i=1}^{L/4} ui$$

to the divider 74D. At the dividers 74A-74D, the accumulation values $$\sum_{i=1}^{L/32} ui, \sum_{i=1}^{L/16} ui, \sum_{i=1}^{L/8} ui \text{ and } \sum_{i=1}^{L/4} ui$$

are divided by $\sqrt{L/32}$, $\sqrt{L/16}$, $\sqrt{L/8}$ and $\sqrt{L/4}$, respectively. Thus, the power density results 36, that is $$\sum_{i=1}^{L/32} ui/\sqrt{L/32}, \sum_{i=1}^{L/16} ui/\sqrt{L/16}, \sum_{i=1}^{L/8} ui/\sqrt{L/8} \text{ and } \sum_{i=1}^{L/4} ui/\sqrt{L/4}$$

are generated at the outputs 75A-75D of the dividers 74A-74D, respectively.

Figure 8:
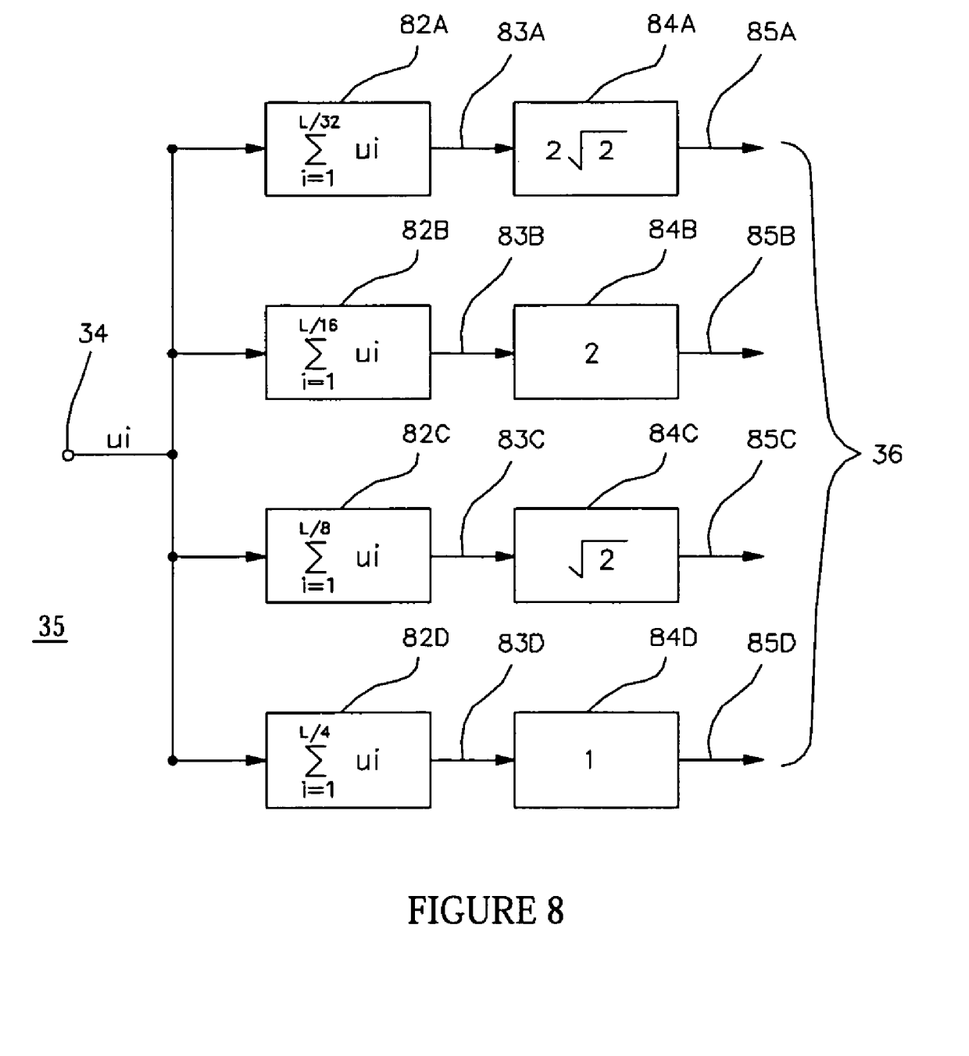
FIG. 8 illustrates a schematic diagram of further exemplary embodiment of the power density calculator as depicted in FIG. 3.

Referring to FIG. 8, schematic diagram of further exemplary embodiment of the power density calculator 35 as depicted in FIG. 3 is illustrated. In this exemplary embodiment, the power density calculator 35 is further simplified to generate $$\sum_{i=1}^{L/32} ui \times 2\sqrt{2}, \sum_{i=1}^{L/16} ui \times 2, \sum_{i=1}^{L/8} ui \times \sqrt{2} \text{ and } \sum_{i=1}^{L/4} ui^2.$$

As shown in FIG. 8, the power density calculator 35 includes four accumulators 82A-82D and four multipliers 84A-84D. As compared with FIG. 7, the power density calculator 35 of FIG. 8 can be implemented without dividers so as to simplify circuit design. The power function ui is first supplied to the accumulators 82A, 82B, 82C and 82D so as to calculate the accumulation values $$\sum_{i=1}^{L/32} ui, \sum_{i=1}^{L/16} ui, \sum_{i=1}^{L/8} ui \text{ and } \sum_{i=1}^{L/4} ui$$

over four different accumulation windows L/32, L/16, L/8 and L/4, respectively. In other words, the output 83A of the accumulator 82A is provided with $$\sum_{i=1}^{L/32} ui$$

to the multiplier 84A, the output 83B of the accumulator 82B is provided with $$\sum_{i=1}^{L/16} ui$$

to the multiplier 84B, the output 83C of the accumulator 82C is provided with $$\sum_{i=1}^{L/8} ui$$

to the multiplier 84C, and the output 83D of the accumulator 82D is provided with $$\sum_{i=1}^{L/4} ui$$

to the multiplier 84D. At the multipliers 84A-84D, the accumulation values $$\sum_{i=1}^{L/32} ui, \sum_{i=1}^{L/16} ui, \sum_{i=1}^{L/8} ui \text{ and } \sum_{i=1}^{L/4} ui$$

are multiplied by $2\sqrt{2}$, 2, $\sqrt{2}$ and 1, respectively. Thus, the power density results 36, that is $$\sum_{i=1}^{L/32} ui \times 2\sqrt{2}, \sum_{i=1}^{L/16} ui \times 2, \sum_{i=1}^{L/8} ui \times \sqrt{2} \text{ and } \sum_{i=1}^{L/4} ui$$

are generated at the outputs 85A-85D of the multipliers 84A-84D, respectively. Preferably, the multiplier 84D can be so omitted that the output 83D of the accumulator 82D severs as the outputs 85A-85D.

Figure 9:
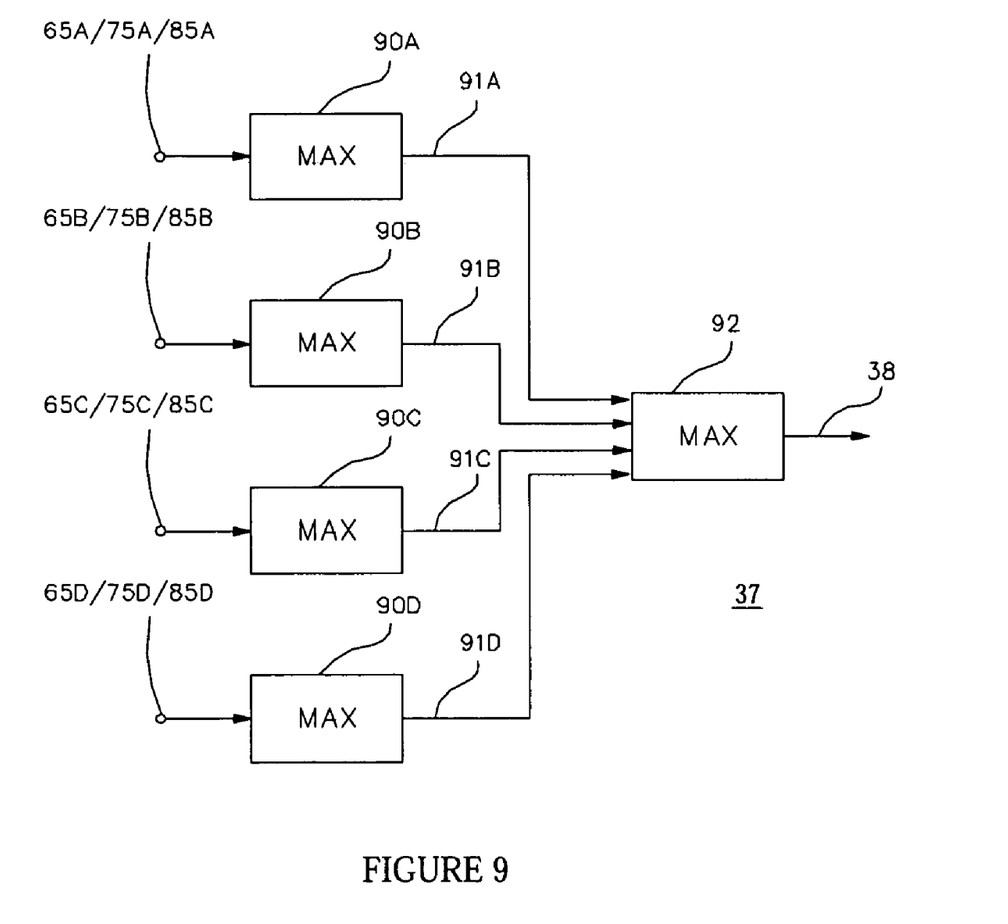
FIG. 9 illustrates a schematic diagram of one exemplary embodiment of the maximum detector as depicted in FIG. 3.

Referring to FIG. 9, a schematic diagram of one exemplary embodiment of the maximum detector 37 as depicted in FIG. 3 is illustrated. A shown in FIG. 9, the maximum detector 37 includes four sub-maximum detection blocks 90A-90D and one main detection block 92. The power density results 36 are supplied to the sub-maximum detection blocks 90A-90D, that is, the output 65A, 75A or 85A of the power density calculator 35 of FIGS. 6-8 is supplied to the sub-maximum detection block 90A, the output 65A, 75A or 85A of the power density calculator 35 of FIGS. 6-8 is supplied to the sub-maximum detection block 90A, the output 65B, 75B or 85B of the power density calculator 35 of FIGS. 6-8 is supplied to the sub-maximum detection block 90B, the output 65C, 75C or 85C of the power density calculator 35 of FIGS. 6-8 is supplied to the sub-maximum detection block 90C, and the output 65D 75D or 85D of the power density calculator 35 of FIGS. 6-8 is supplied to the sub-maximum detection block 90D. The outputs 91A-91D of the sub-maximum detection blocks 90A-90D are all applied to the main maximum detection block 92 to determine main maximum value of four power density results 36 to be the determination result 38.

Figure 10A:
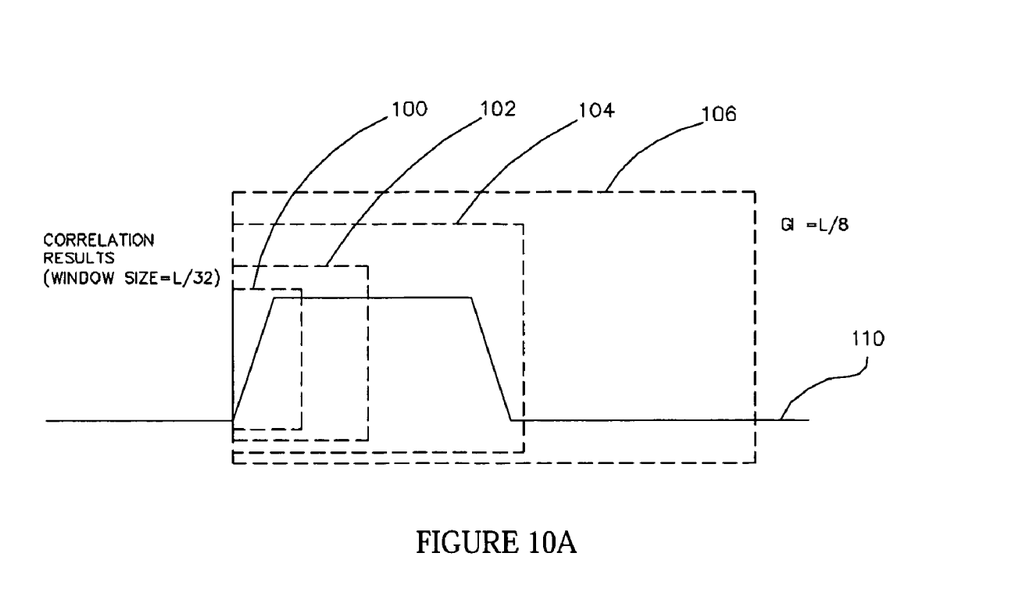
FIG. 10A illustrates correlation results by taking the received information signals with a guard interval length of L/8 as an example.
Figure 10B:
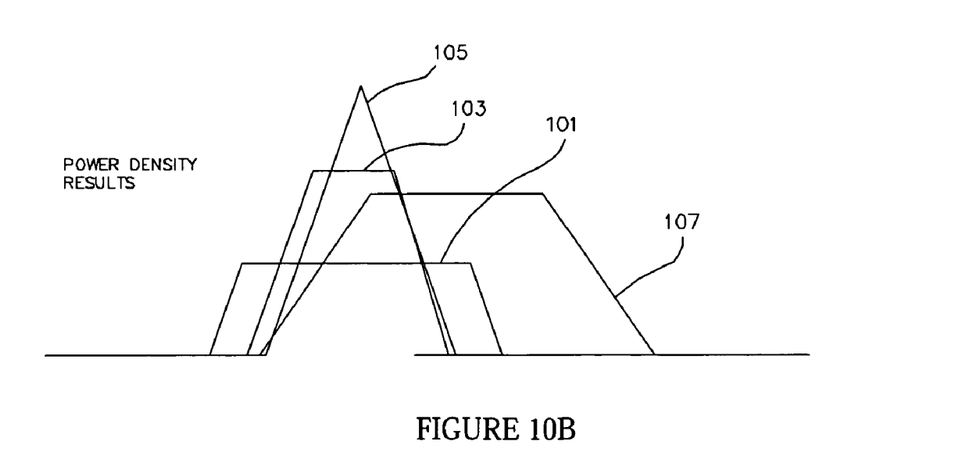
FIG. 10B illustrates power density results associated with the correlation results as depicted in FIG. 10A.

Referring to FIGS. 10A and 10B, FIG. 10A illustrates correlation results 32 by taking the received information signals with a guard interval length of L/8 as an example, while FIG. 10B illustrates the power density results 36 associated with the correlation results 32 as depicted in FIG. 10A. In FIG. 10A, a curve 110 designates the correlation result with the window size L/32 (or, namely the minimum guard length) when the received digital samples 30 is provided with a guard interval length of L/8. Reference numerals 100, 102, 104 and 106 of FIG. 10A designate accumulation windows L/32, L/16, L/8 and L/4 used by the accumulators 62A-62D of FIG. 6, the accumulators 72A-72D of FIG. 7 and the accumulators 82A-82D of FIG. 8, respectively. As shown in FIG. 10B, curves 101, 103, 105 and 107 designate the power density results 36 at the output 65A/75A/85A using the accumulation window L/32, the output 65B/75B/85B using the accumulation window L/16, the output 65C/75C/85C using the accumulation window L/8, and the output 65D/75D/85D using the accumulation window L/4, respectively. If all of the curves 101, 103, 105 and 107 are supplied to the maximum detector 37, the curve 105 with the accumulation window L/8 is found to have the maximum value such that the guard interval is determined to be L/8 accurately.

As explained above, the guard interval detector of the present invention has the power density calculator to provide power density results or simplified power density results, and a maximum detector to determine the maximum value of the power density results or the simplified power density results such that the guard interval length of the received information signals can be determined accurately. Moreover, the guard interval detector of the present invention can be applied to a multi-carrier receiver that is robust enough to deal with noisy signals, and with signals that suffer from multipath and co-channel interference. Furthermore, the guard interval detector of the present invention can be easily implemented without complicated circuit design.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A guard interval detector for determining a guard interval length of an input signal, said guard interval length being one of a plurality of available guard interval lengths, said guard interval detector comprising:

an auto-correlator for generating a correlation result in response to said input signal;

a power density calculator for generating a plurality of power density results in response to said correlation result and said available guard interval lengths; and a maximum detector for generating a determination result in response to the maximum value of said plurality of power density results, wherein said maximum detector comprises:

a plurality of sub-maximum detection blocks for determining a plurality of sub-maximum values of said plurality of power density results, respectively; and a main maximum detection block for determining the maximum value of said plurality of sub-maximum values and generating said determination result.

2. The guard interval detector as claimed in claim 1, wherein said power density calculator comprises:

a squarer for generating a correlation result square in response to said correlation result;

a plurality of accumulators for generating a plurality of accumulation values by accumulating said correlation result square in response to said plurality of available guard interval lengths, respectively; and a plurality of dividers for generating said plurality of power density results by dividing said plurality of accumulation values with said plurality of available guard interval lengths, respectively.

3. The guard interval detector as claimed in claim 1, wherein said power density calculator comprises:

a plurality of accumulators for generating a plurality of accumulation values by accumulating said correlation result in response to said plurality of available guard interval lengths, respectively; and a plurality of dividers for generating said plurality of power density results by dividing said plurality of accumulation values with the roots of said plurality of available guard interval lengths, respectively.

4. The guard interval detector as claimed in claim 1, wherein said power density calculator comprises:

a plurality of accumulators for generating a plurality of accumulation values by accumulating said correlation result in response to said plurality of available guard interval lengths, respectively; and a plurality of multipliers for generating said plurality of power density results by multiplying said plurality of accumulation values with a plurality of constants associated with said plurality of available guard interval lengths, respectively.

5. A method for determining a guard interval length of an input signal, said guard interval length being one of a plurality of available guard interval lengths, said method comprising the following steps of:

(a) generating a correlation result in response to said input signal;

(b) generating a plurality of power density results in response to said correlation result and said available guard interval lengths; and (c) generating a determination result in response to the maximum value of said plurality of power density results, wherein step (c) further comprises:

determining a plurality of sub-maximum values of said plurality of power density results, respectively; and determining the maximum value of said plurality of sub-maximum values and generating said determination result.

6. The method as claimed in claim 5, wherein step (b) further comprises:

generating a correlation result square in response to said correlation result;

generating a plurality of accumulation values by accumulating said correlation result square in response to said plurality of available guard interval lengths, respectively; and generating said plurality of power density results by dividing said plurality of accumulation values with said plurality of available guard interval lengths, respectively.

7. The method as claimed in claim 5, wherein step (b) further comprises:

generating a plurality of accumulation values by accumulating said correlation result in response to said plurality of available guard interval lengths, respectively; and generating said plurality of power density results by dividing said plurality of accumulation values with the roots of said plurality of available guard interval lengths, respectively.

8. The method as claimed in claim 5, wherein step (b) further comprises:

generating a plurality of accumulation values by accumulating said correlation result in response to said plurality of available guard interval lengths, respectively; and generating said plurality of power density results by multiplying said plurality of accumulation values with a plurality of constants associated with said plurality of available guard interval lengths, respectively.

9. A guard interval detector for determining a guard interval length of an input signal, said guard interval length being one of a plurality of available guard interval lengths, said guard interval detector comprising:

an auto-correlator for generating a correlation result in response to said input signal;

a noise suppressor for generating a power function in response to said correlation result;

an power density calculator for generating a plurality of power density results in response said power function and said available guard interval lengths; and a maximum detector for generating a determination result in response to the maximum value of said plurality of power density results, wherein said maximum detector comprises:

a plurality of sub-maximum detection blocks for determining a plurality of sub-maximum values of said plurality of power density results, respectively; and a main maximum detection block for determining the maximum value of said plurality of sub-maximum values and generating said determination result.

10. The guard interval detector as claimed in claim 9, wherein said power density calculator comprises:

a squarer for generating a power function square in response to said power function;

a plurality of accumulators for generating a plurality of accumulation values by accumulating said power function square in response to said plurality of available guard interval lengths, respectively; and a plurality of dividers for generating said plurality of power density results by dividing said plurality of accumulation values with said plurality of available guard interval lengths, respectively.

11. The guard interval detector as claimed in claim 9, wherein said power density calculator comprises:

a plurality of accumulators for generating a plurality of accumulation values by accumulating said power function in response to said plurality of available guard interval lengths, respectively; and a plurality of dividers for generating said plurality of power density results by dividing said plurality of accumulation values with the roots of said plurality of available guard interval lengths, respectively.

12. The guard interval detector as claimed in claim 9, wherein said power density calculator comprises:

a plurality of accumulators for generating a plurality of accumulation values by accumulating said power function in response to said plurality of available guard interval lengths, respectively; and a plurality of multipliers for generating said plurality of power density results by multiplying said plurality of accumulation values with a plurality of constants associated with said plurality of available guard interval lengths, respectively.

13. A method for determining a guard interval length of an input signal, said guard interval length being one of a plurality of available guard interval lengths, said method comprising the following steps of:

(a) generating a correlation result in response to said input signal;

(b) generating a power function in response to said correlation result;

(c) generating a plurality of power density results in response to said power function and said available guard interval lengths; and (d) generating a determination result in response to the maximum value of said plurality of power density results, wherein step (d) further comprises:

determining a plurality of sub-maximum values of said plurality of power density results, respectively; and determining the maximum value of said plurality of sub-maximum values and generating said determination result.

14. The method as claimed in claim 13, wherein step (c) further comprises:

generating a power function square in response to said power function;

generating a plurality of accumulation values by accumulating said power function square in response to said plurality of available guard interval lengths, respectively; and generating said plurality of power density results by dividing said plurality of accumulation values with said plurality of available guard interval lengths, respectively.

15. The method as claimed in claim 13, wherein step (c) further comprises:

generating a plurality of accumulation values by accumulating said power function in response to said plurality of available guard interval lengths, respectively; and generating said plurality of power density results by dividing said plurality of accumulation values with the roots of said plurality of available guard interval lengths, respectively.

16. The method as claimed in claim 13, wherein step (c) further comprises:

generating a plurality of accumulation values by accumulating said power function in response to said plurality of available guard interval lengths, respectively; and generating said plurality of power density results by multiplying said plurality of accumulation values with a plurality of constants associated with said plurality of available guard interval lengths, respectively.

* * * * *

UNITED STATES PATENT AND TRADEMARK OFFICE
CERTIFICATE OF CORRECTION

PATENT NO. : 7,570,666 B2  Page 1 of 1
APPLICATION NO. : 11/046766
DATED : August 4, 2009
INVENTOR(S) : Hung-Hsiang Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Seventh Day of September, 2010

David J. Kappos
*Director of the United States Patent and Trademark Office*